UNITED STATES PATENT OFFICE.

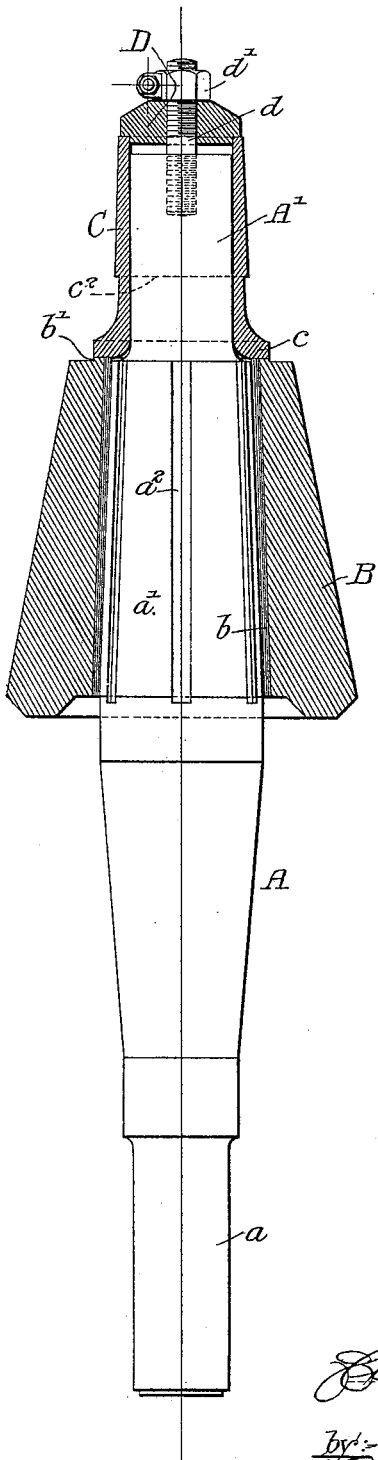

CLARENCE A. BURNS, OF NEW YORK, N. Y., ASSIGNOR TO THE GATES IRON WORKS, OF CHICAGO, ILLINOIS.

GYRATING SHAFT FOR ROCK OR ORE CRUSHERS.

SPECIFICATION forming part of Letters Patent No. 582,846, dated May 18, 1897.

Application filed July 18, 1896. Serial No. 599,594. (No model.)

*To all whom it may concern:*

Be it known that I, CLARENCE A. BURNS, a citizen of the United States, residing at New York, in the county and State of New York, have invented certain new and useful Improvements in Gyrating Shafts for Rock or Ore Crushers, of which the following is a specification.

The object of my invention is to provide a simple, economical, and efficient gyrating shaft; and the invention consists in the features, combinations, and details of construction hereinafter described and claimed.

In the accompanying drawing the figure is an elevation, partly in section, of a gyrating shaft with my improvements attached thereto.

In the art to which this invention relates it is well known that the gyrating shaft and bearing or journal portions are made in one piece, so that when the bearing portion—particularly the cone-bearing portion—wears the shaft has to be thrown away. It is further well known that the "spider" portion has also to be thrown away when either the conical bearing for the shaft is worn off or irregular or the bearing portion of the shaft has become worn or irregular. To remove these objections and provide a gyrating shaft with a removable bearing portion that also acts to hold the crushing-head in position is the principal object of my invention.

In constructing a gyrating shaft in accordance with my improvements I make a shaft portion A, of the desired size and shape, and provide it with the usual lower portion $a$, by which it is gyrated. Near the upper portion of the shaft is the portion $a'$, that is tapered and grooved longitudinally, as at $a^2$, to receive the crushing-head B. The crushing-head is also tapered and grooved longitudinally, as at $b$, so that it may be moved around until its grooves register with the grooves in the crushing-shaft, when soft-metal keys are inserted to prevent any lateral disturbance in the position of the parts.

In order to hold the crushing-head in place, I prefer to turn the upper portion of the shaft at $A'$ down to the desired diameter, which is slightly smaller than the diameter of the lower portion of the recesses or longitudinal grooves. I then provide a metal bearing portion C, of the desired size and tapered at its upper portion and which is bored out to fit the upper portion of the shaft. The lower portion of this bearing portion is provided with a flanged shoulder $c$, that contacts the boss or hub $b'$ on the crushing-head when the bearing is in position, forcing the head downwardly into a close engagement with the gyrating shaft. To hold the parts in such relation during the operation of the machine, I provide a cap portion D and a screw-stud $d$ and lock-nut $d'$. By turning the lock-nut the desired amount the bearing portion C is firmly pressed down to the crushing-head, while a reverse movement of the nut serves to allow the cap to be taken off from the bearing, the bearing to be removed, and, if necessary, repaired or replaced. While I have shown the removable bearing portion as made in one integral portion it can be made in two—that is, the lower portion can be made in one piece or the parts separated at the line $c^2$, so that when it is necessary to replace the bearing only the upper portion need be removed.

The principal advantages of my improvement are that when the bearing portion has become worn or irregular it can be removed and a new one inserted in its place, or, if the journal-bearing of the spider becomes worn or irregular, it may be rebored and a larger journal or bearing portion furnished for the shaft, so that instead of throwing away two parts, as is the case in present practice, it is only necessary to throw away the old or worn bearing or journal portion. Again the mechanism provides a very economical method of holding the head and shaft in operative engagement.

In illustrating and describing my improvement I have only thought it necessary to illustrate and describe that which is new in connection with so much of the mechanism as is old in order to disclose my invention and enable those skilled in the art to practice the same, leaving out of consideration all such parts of the mechanism and machine as are well known and understood in the art and which if described or illustrated would only tend to confuse or render ambiguous the invention.

I claim—

1. In a machine of the class described, the combination of a gyrating shaft, a crushing-head thereon, and a removable upper bearing portion arranged to hold the crushing-head in position, substantially as described.

2. In a machine of the class described, the combination of a gyrating shaft provided with a tapered portion having longitudinal grooves or slots, a crushing-head thereon provided with longitudinal grooves or slots registering with the grooves or slots in the shaft, soft-metal keys in the grooves or slots, a removable bearing or journal portion on the shaft arranged to contact the head portion adjacent to the grooves or slots and hold the head and shaft in operative engagement, a cap portion on the outer end of the removable journal-bearing, and bolt mechanism for locking and holding the parts in operative position, substantially as described.

CLARENCE A. BURNS.

Witnesses:
THOMAS B. MCGREGOR,
ANNIE C. COURTENAY.